Nov. 27, 1962 E. J. SLOBODZINSKI ETAL 3,066,231

FLIP-FLOP CIRCUIT HAVING PULSE-FORMING NETWORKS IN THE CROSS-COUPLING PATHS

Filed July 30, 1958 3 Sheets-Sheet 3

United States Patent Office 3,066,231

Patented Nov. 27, 1962

3,066,231

FLIP-FLOP CIRCUIT HAVING PULSE-FORMING NETWORKS IN THE CROSS-COUPLING PATHS

Edwin J. Slobodzinski, Hopewell Junction, and Gordon W. Neff, Mahopac, N.Y., assignors to International Business Machines Corporation, New York, N.Y., a corporation of New York Filed July 30, 1958, Ser. No. 752,138

9 Claims. (Cl. 307—88.5)

This invention relates to binary trigger circuits which are widely used in computing apparatus and also as counting devices.

In the construction of computing systems, binary trigger circuits form useful building blocks. By minor and well known changes in input and output circuits, they may be utilized for a variety of functions and to provide outputs conforming with desired computer logic. In its simpler form, a binary trigger circuit responds to two successive impulses of the same polarity to produce a single output pulse. Each output pulse may, therefore, be said to count a pair of input pulses. By cascading such circuits, each succeeding stage may provide a binary count of a higher order than the preceding stage.

In accordance with the present invention, a high-speed binary trigger has been developed which will count at a high rate. Use is made of direct and conductively coupled switching elements, such as transistors, which function with great dependability in operation.

Further in accordance with the present invention, the flip-flop circuit comprises a pair of cross-connected transistors. In a branch control circuit for each transistor there is provided a source of current, a resistor, and a pulse-forming network. The pulse-forming network has a characteristic impedance approximately equal to that of the input resistor forming a part thereof. Input pulses are applied to a common input circuit for the pair of cross-connected transistors. The arrangement includes connections so that each pulse-forming network provides voltage pulses greater than the length of the applied input pulses. First one and then the other of the transistors is rendered non-conductive upon application of said input pulses; and the respective cross-connected transistor is rendered conductive at times corresponding with the termination of those pulses as applied to the common input circuit. The N-stable operation is achieved by transferring current flow through the branch biasing circuit from a transistor which was previously conductive to the branch circuit associated with the other transistor which was previously non-conductive, thereby to condition the latter transistor to be conductive, the applied input pulse changing the biasing of the last-mentioned transistor to render it conductive upon termination of the applied input pulse.

Figure 1:
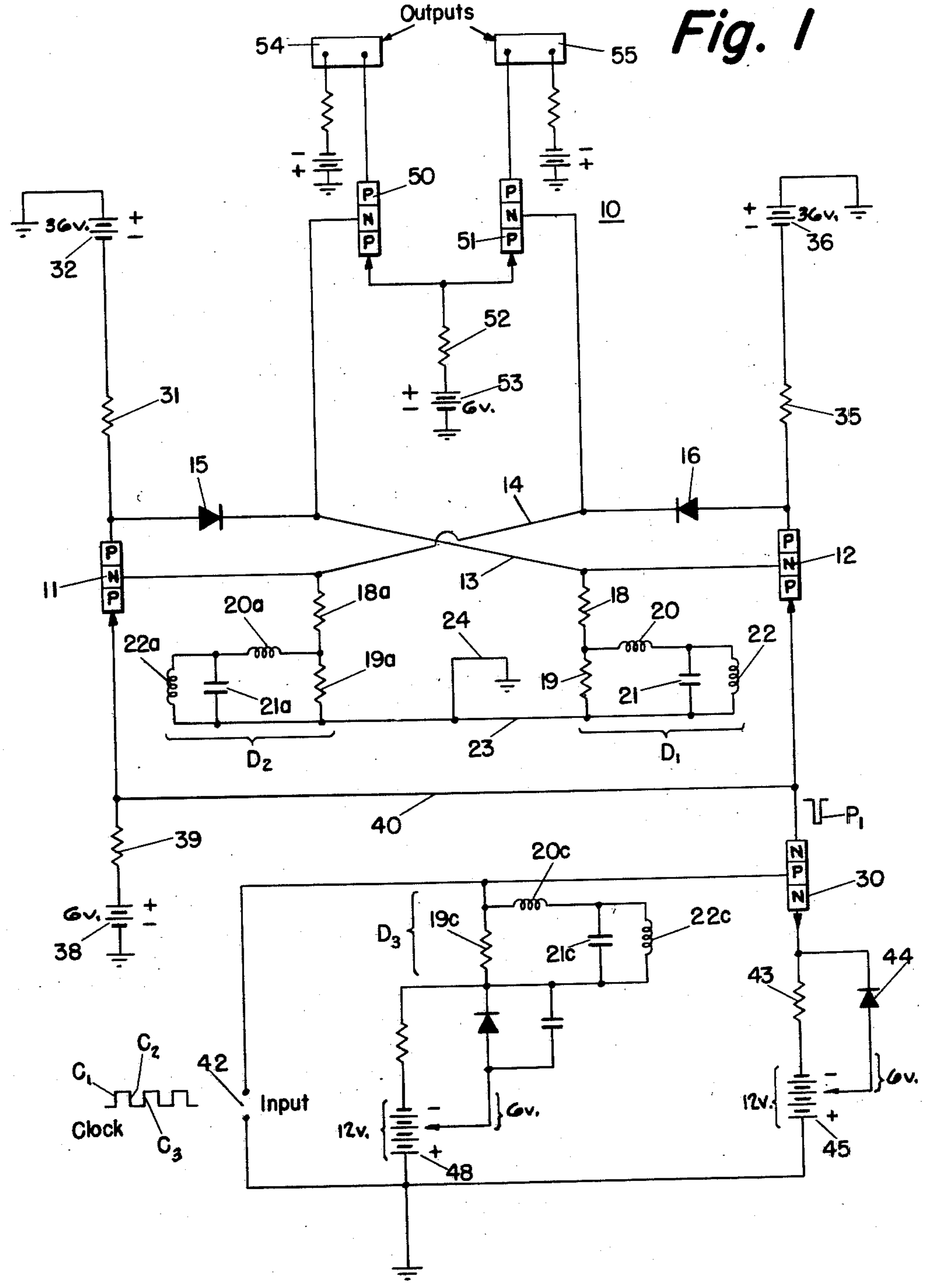
Figure 2:
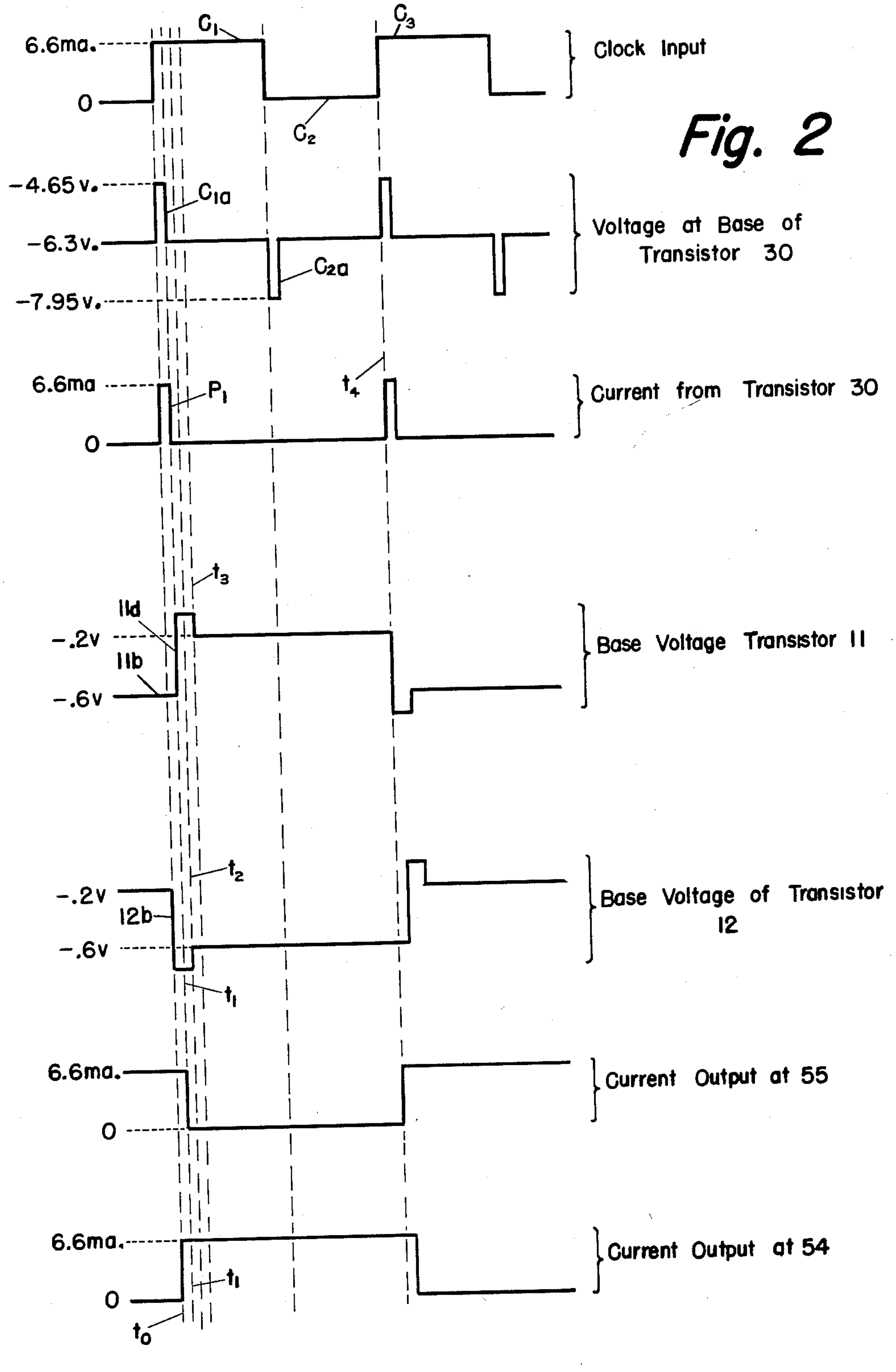
Figure 3:
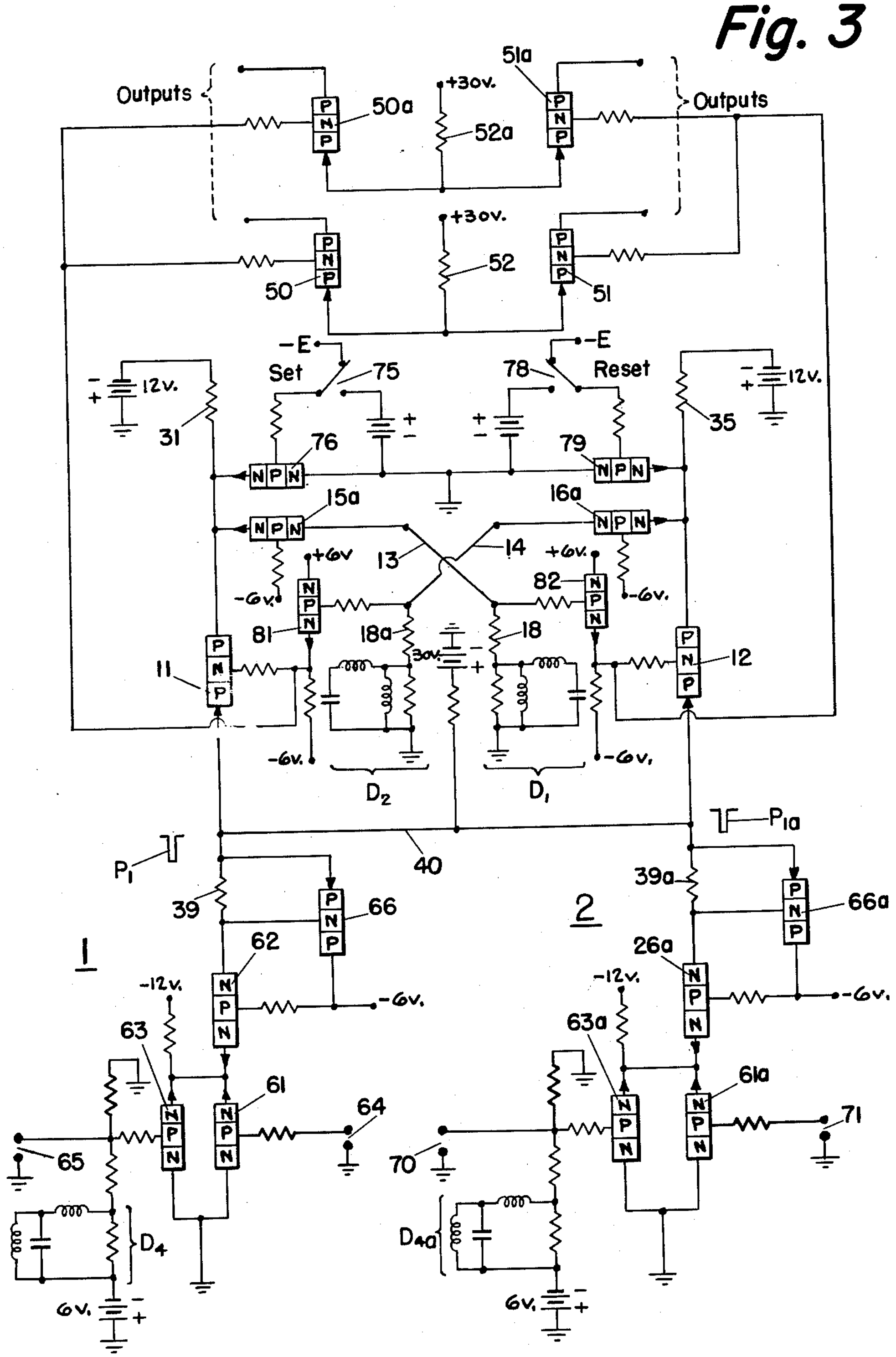

For further objects and advantages of the invention and for typical embodiments thereof, reference is to be had to the following description taken in conjunction with the accompanying drawings, in which:

FIG. 1 schematically illustrates a trigger circuit embodying the invention;

FIG. 2 is a graph helpful in explaining the operation of the circuit of FIG. 1; and FIG. 3 schematically illustrates another embodiment of the invention.

Referring to FIG. 1, the binary trigger circuit 10 includes a pair of transistors 11 and 12 illustrated as of the PNP type and cross-connected by circuits including conductors 13 and 14 to form the flip-flop portion of the binary trigger. The cross-connected circuit including the conductor 13 includes a Zener diode 15. The other cross-connected circuit includes a Zener diode 16. As will later be shown, it will be preferable to utilize transistors for the diodes 15 and 16. To each cross-connected circuit there is a branch circuit including a resistor and a pulse-forming network. More particularly, to the conductor 13 the branch circuit extends by way of a resistor 18, a terminating resistor 19 for the pulse-forming network $D_1$, and by way of conductors 23 and 24 to ground. The pulse-forming network $D_1$ includes an inductor 20 in series with a parallel branch formed by a capacitor 21 and a second inductor 22. To the circuit including conductor 14 there extends a like branch circuit to which like reference characters have been applied with the addition of the subscript "*a*."

The circuit components of the pulse-forming networks $D_1$ and $D_2$ are selected to provide voltage pulses greater than the duration of an applied impulse $P_1$ at the input circuit to the transistors 11 and 12. The length of the applied impulse $P_1$ is controlled so as to be of predetermined duration and preferably as by a third pulse-forming network $D_3$ to which the same reference characters have been applied as above but with the addition of the subscript "*c*." The pulse-forming network $D_3$ is designed to provide a voltage pulse less than that formed by the pulse-forming networks $D_1$ and $D_2$ of the aforesaid branch circuits. Though other values may be selected for particular applications, the inductors of the pulse-forming networks $D_1$ and $D_2$ may each have an inductance of 2.2 microhenries, with each capacitor having a capacitance of 22 micromicrofarads. A shorter pulse is provided by the pulse-forming network $D_3$ where the inductors may each have a value of 1.5 microhenries, with capacitor **21*c* having a value of 5 micromicrofarads. The characteristic impedance of pulse-forming networks $D_1$ and $D_2$ will be of the order of 300 ohms and, therefore, the terminating resistors 19 and 19*a* are made to have approximately that value, for example, 320 ohms. The characteristic impedance for the pulse-forming network $D_3$ will be about 500 ohms, and resistor 19*c* is selected to have approximately that same value. The resistors 18 and 18*a* may have values of, say, 89 ohms. The input circuit to the flip-flop transistors 11 and 12 includes an input transistor 30**.

With the above understanding of the general organization of the circuit, the operation thereof will now be described by assuming that transistor 11 is conductive. With transistor 11 conductive, current will be flowing from the collector of that transistor to a 10-milliampere current sink, the current flow being by way of a resistor 31 and a battery 32 and thence to ground. The transistor 12 is likewise connected to a 10-milliampere current sink including a resistor 35 and a battery 36. Since transistor 12 is in its non-conductive state, the major proportion of the 10-milliamperes to the current sink of transistor 12 will flow as from ground by way of conductors 24 and 23 through resistors **19*a* and 18*a*, conductor 14, and by way of the Zener diode 16, which is operating in its substantially constant reverse-voltage range, to the current sink including resistor 35 and battery 36**.

With the further assumption that transistor 12 has been non-conductive for a time exceeding the pulse time of the pulse-forming network $D_2$, it will be understood that the network, as far as current flow is concerned, represents a short-circuit across the terminating resistor **19*a*. Accordingly, the potential difference due to the current flow through the resistor 18*a* of 89 ohms develops a negative bias between the base and emitter of transistor 11. Thus, the flow of current through resistor 18*a* is in a direction to maintain transistor 11 in its conductive state. The negative biasing potential may be of the order of 0.6 volt. To the current flowing through diode 16 by way of resistor 18*a*, there is added the base current from transistor 11 and the base current from transistor 51. The latter is in its conductive state since its base is connected to the base of transistor 11. Thus the current through diode 16 will be equal to 10-milliamperes, less the back current of transistor 12**.

The current flow through transistor 11 is by way of a supply circuit from ground (+36 volts) by way of a battery 38, a resistor 39, transistor 11, and thence to the current sink by way of resistor 31. With resistors 39 and 31 having values respectively of 910 ohms and 3.6K, the current flow will be of the order of 6.6 milliamperes. The remaining current to the 10-milliampere sink of 3.4 milliamperes will for the most part be by way of the ground connection and conductors 24 and 23, the pulse-forming network $D_1$, resistor 18, conductor 13, diode 15, and thence to the current sink. For the operating condition under consideration at the moment, the value of current through the branch circuit including the resistor 18 is of a much lower order than through the branch circuit including resistor **18*a***. The foregoing disparities in the values of current between the two branches represent an important feature of operation, as will now be explained.

Assuming now there is applied to the common input circuit of the transistors 11 and 12, having their emitters connected together by a conductor 40, a current pulse $P_1$ of predetermined duration, the following occurs. The current pulse applied to the emitter of transistor 11 turns it off. Since transistor 12 is already non-conductive, the pulse $P_1$ has no direct effect upon it. When transistor 11 is rendered non-conductive, that part of the 10-milliamperes flowing to the sink can no longer be supplied as forward current through transistor 11. Current substantially corresponding in value to the forward current is then supplied through the circuit which extends from ground by way of conductors 24 and 23 by way of the pulse-forming network $D_1$, resistor 18, cross-connection conductor 13, diode 15 to the current sink including resistor 31. The increased current flow in the branch including the pulse-forming network $D_1$ is by way of its terminating resistor 19. The rise in current corresponds with an applied current step to the pulse-forming network, which network has a response in time so as to present an impedance to current flow for the round-trip propagation time through network $D_1$, and thereby generating at the base of transistor 12 a negative bias determined by the current flowing through resistor 18, and resistor 19 in parallel with the characteristic impedance of the pulse-forming network. The negative bias at the base of transistor 12 is in excess of that at the base of transistor 11 by the change in current through the pulse-forming network for the round-trip propagation time of the network $D_1$.

The result of the foregoing is the development of a high negative bias applied to the base of the transistor 12. The negative bias exceeds that developed by the branch circuit including resistor **18*a* since in the branch connected to the base of transistor 12, resistor 18 and the effective resistance of resistor 19 and the pulse-forming network act to produce the increase. Accordingly, transistor 12 is conditioned to be conductive in preference to transistor 11. Transistor 12 does not conduct, however, during the application of current pulse $P_1$ since the latter maintains it non-conductive. However, as soon as pulse $P_1$ disappears, transistor 12 is turned on. The larger negative potential applied to transistor 12 which made it conductive in preference to transistor 11 continues to be applied to transistor 12 for a time determined by the pulse-forming network $D_1$. The net effect is the elimination, effectively, of the additional resistance or impedance in circuit with resistor 18 with consequent reduction in the magnitude of the negative bias applied to transistor 12**.

At the instant that transistor 12 was made conductive, as at time $t_1$, FIG. 2, the current flow through the cross-connection including conductor 14 and the branch circuit including the pulse-forming network $D_2$ was materially decreased. The resulting effect is the reduction of the negative biasing potential applied to the base of the transistor 11. This decrease in the negative potential is shown at **11*d*, FIG. 2, and further serves to maintain transistor 11** in a non-conductive condition.

After the termination of the pulse from the pulse-forming network $D_1$ to the terminating impedance 19, that network thereafter acts as a short-circuit for the terminating impedance, and thus the negative potential applied to the base of transistor 12 is decreased, as shown at time $t_2$, FIG. 2.

The flip-flop circuit will be maintained in the described state of conductivity until there is applied to the emitters of transistors 11 and 12 a second current pulse like $P_1$. When this occurs, as at time $t_4$, transistor 12 will be turned off and as a result of its non-conductivity, current will then flow by way of the diode 16 and conductor 14 thorugh the branch circuit including resistors **18*a* and 19*a*. This flow of current effectively applies an impulse to the pulse-forming network $D_2$. Meanwhile, the applied pulse, like $P_1$, disappears. Due to the increased negative bias applied to transistor 11, it is made conductive upon disappearance of the applied pulse. Less current then flows through the diode 15 and conductor 13 through the branch circuit including pulse-forming network $D_1$. As the reflected impulse arrives at the terminating impedance 19*a*, that network thereafter acts as a short-circuit and reduces the negative bias applied to transistor 11**. The flip-flop circuit is then conditioned for the next pulse and will operate again as above described.

The manner in which the applied pulse $P_1$ is predetermined as to duration will now be described, together with a brief résumé of operation in terms of the timing diagram of FIG. 2. Where the binary trigger circuit is used as a timing device or as a part of a "logic box," it is conventional to apply to an input circuit clock pulses. Thus, a positive-going current pulse $C_1$ from the clock is applied to the input terminals 42 included in the input circuit to the transistor 30. This transistor is biased normally to be non-conductive as by a bias circuit including resistor 43 and a diode 44 respectively connected to a battery 45 to provide potentials as indicated by the labels "12 V." and "−6 V." The biasing circuit includes battery 48, resistor 47, shunted by a diode, and the pulse-forming network $D_3$.

The positive-going pulse $C_1$ is of magnitude to overcome the reverse bias on transistor 30, of the NPN type, and to render it conductive. This initiates the beginning of the previously described pulse $P_1$.

The applied positive-going pulse $C_1$ produces current flow through a branch circuit which includes the pulse-forming network $D_3$, the resistor 47, and the battery 48. The current pulse through said branch line initiates a voltage pulse across the pulse-forming network $D_3$. Since the pulse time of pulse-forming network $D_3$ is shorter than the time of networks $D_1$ and $D_2$, the pulse applied to pulse-forming network $D_3$ is returned to the terminating resistor **19*c* thereof ahead of the arrival of the pulse applied to either of networks $D_1$ or $D_2$. As soon as the pulse is returned to the terminating resistor 19*c* of pulse-forming network $D_3$, the result is to reduce in the branch circuit the impedance or resistance due to the inclusion of the pulse-forming network including its terminating resistor. Accordingly, the reduction in impedance of the branch line causes a substantial reduction in the magnitude of the applied pulse $C_1$ as applied to the input circuit of transistor 30. This reduction in magnitude of the positive-going pulse permits the biasing circuit including battery 48 to turn off transistor 30, thereby to limit the duration of the output pulse $P_1$. It limits the duration of pulse $P_1$ to a time less than the duration of the applied positive-going pulse $C_1$. Thus as shown in FIG. 2, the positive-going pulse $C_{1a}$ as applied to the base of transistor 30 is of short duration, the same duration as that of pulse $P_1$ which, in FIG. 1, is illustrated as a negative-going voltage pulse, while in FIG. 2 it is illustrated as a current excursion through transistor 30** and identified as $P_1$.

Before continuing the description of the timing diagram of FIG. 2, it is to be noted that when the clock applies to the input terminals 42 a negative-going pulse $C_2$, there is applied to the input circuit of transistor 30 a negative-going pulse $C_{2a}$. This pulse is ineffective since it is in a direction to turn off transistor 30 which has already been rendered non-conductive.

The input pulse $P_1$, when it turns off transistor 11 and transfers current to the branch including resistor 18, as indicated in FIG. 2 at 12*b*, makes the base of transistor 12 more negative than the base of transistor 11 as shown at 11*b* so that transistor 12 is conditioned to be turned on at time $t_1$.

At time $t_1$, the applied pulse $P_1$ disappears and transistor 12 is turned on. The reduction in current through the branch including resistor 18*a*, due to transfer of that current to the circuit including transistor 12, has the effect of producing at the base of transistor 11 a positive-going pulse, as indicated in FIG. 2 at 11*d*, which assures that transistor 11 is turned off.

When the pulse applied to the pulse-forming network $D_1$ is returned to its terminating resistor 19, there is a reduction in the negative biasing potential on the base of transistor 12 which occurs at time $t_2$.

At time $t_3$, there is a decrease in the magnitude of the positive-going pulse applied to the base of transistor 11. This occurs due to the application to pulse-forming network $D_2$ of a pulse resulting from the reduction in current through its resistor 19*a* and the return of that pulse to resistor 19*a*.

When the next positive-going pulse $C_3$ is applied to the input terminals 42, the above-described operations again take place with change in potentials, as shown in FIG. 2, to turn off transistor 12 and again to turn on transistor 11.

Output circuits of different character may be provided, the output circuits shown in FIG. 1 including transistors 50 and 51 having their emitters connected together and through a resistor 52 to a source of biasing potential shown as a battery 53. Output transistor 50 will be conductive whenever transistor 12 is rendered conductive, and transistor 51 will be conductive whenever transistor 11 is conductive. Current outputs will be derived by way of the output circuits 54 and 55 of these transistors 50 and 51.

Now that the principles of the invention have been explained, it will be understood that modifications may be made and values of circuit components varied in manner understood by those skilled in the art. It is also to be understood that the system of FIG. 1 has usefulness in circuits of widely differing types. The adaptability of the system of FIG. 1 has been illustrated in FIG. 3 where so far as possible like elements have been given like reference characters. In FIG. 3 there is utilized the flip-flop circuit of FIG. 1, but with some modification therein and with the addition of further output circuits provided by transistors 50*a* and 51*a*. FIG. 3 likewise includes two gates instead of the single input arrangement of FIG. 1.

Referring first to gate 1, a pair of transistors 61 and 62 together with transistor 63 are connected together in manner described and claimed in application Serial No. 622,307, filed November 15, 1956 by Hannon S. Yourke, entitled "Transistor Switching Circuits," now Patent No. 2,964,652, and assigned to the same assignee as the present invention. When transistor 61 is on, transistor 62 is off. Transistor 63 in parrallel with transistor 61 likewise cooperates with transistor 62. If both transistors 61 and 63 are off, then transistor 62 is on, but if either of transistors 61 and 63 is on, then transistor 62 is off. From this brief description it will be seen that the conductivity of transistors 61 and 63 may be controlled by the input circuits 64 and 65. Thus, the input circuit at terminals 64 to transistor 61 may perform the functions of an inhibit circuit, while the input terminals 65 are arranged to receive applied impulses.

When a negative-going pulse is applied at terminals 65, and assuming that transistor 61 is off, the applied pulse will turn transistor 63 off and transistor 62 will thereby be turned on. The result will be the application to transistors 11 and 12 of the flip-flop circuit of a pulse which is in a direction to turn them off. Since only one of the transistors will be conductive, that one will be turned off. Transistor 66 of gate 1 provides positive feedback to assure greater certainty of operation. There is associated with gate 1 a branch circuit including a pulse forming network $D_4$ which functions in the same manner as the pulse forming network $D_3$ of FIG. 1, that is to say, pulse forming network $D_4$ limits the duration of the applied pulses applied to the flip-flop circuit.

Gate 2 includes circuit components exactly like those of gate 1 and, accordingly, the same reference characters have been added thereto with the addition of the subscript "*a*," the only exception being the reference characters identifying the input circuits.

When an input signal is applied at input terminals 64 to make transistor 61 non-conductive, there will at the same time be applied an input signal at terminal 71 to make transistor 61*a* conductive, thus maintaining transistor 62*a* non-conductive. This provides the selectivity of operation needed. The dual outputs of FIG. 3 may be multiplied, and they are useful in interconnecting the system of FIG. 3 to other like systems or to other "logic boxes" for which the system of FIG. 3 is particularly applicable.

It will be recalled that in the description of the system of FIG. 1 it was assumed that transistor 11 was on and transistor 12 was off. The same assumption is here made for the system of FIG. 3. However, it is desired to initiate operations with transistor 12 on and transistor 11 off. In FIG. 3 this condition may be realized by pressing the reset push-button switch 78 which applies a positive potential to an NPN transistor 79 to turn it on. The current flow through transistor 79 makes the base of transistor 11 positive relative to the base of transistor 12 and thus turns off transistor 11. Had transistor 12 been on and transistor 11 off, a set push-button switch 75 associated with a transistor 76 would be operated to turn off transistor 12 and to turn on transistor 11. With transistor 12 on, it will be assumed that there is applied to the common emitter circuits a negative-going pulse, such as $P_{1a}$, which, of course, turns off transistor 12. With transistor 12 on, transistor 15*a* would be on. As soon as transistor 12 is turned off by pulse $P_{1a}$, transistor 16*a* is turned on. Thus, there is an instantaneous and large increase in current flow through the branch circuit including pulse forming network $D_2$, series resistor 18*a*, and by way of conductor 14 through transistor 16*a*. This initiates the control pulse in the pulse forming network $D_2$ as described in connection with FIG. 1. The increase in current flow applies a negative-going pulse to the transistor 81, which in turn applies a negative pulse to the base of transistor 11, thereby conditioning it preferentially to be turned on at the termination of the applied pulse $P_{1a}$. When that pulse terminates, transistor 11 is turned on and there are concurrently developed at the output transistors 50 and 50*a* output pulses.

When the pulse applied to the pulse forming network $D_2$ is reflected to its terminating impedance, that impedance or resistor is effectively removed from the branch circuit, thereby to decrease the negative potential previously applied to the NPN transistor 81. The circuit is now conditioned for the application of the next pulse, for example, $P_1$ from the gate 1.

The operation has been described whereby transistor 11 is conductive and transistor 12 is non-conductive and the pulse $P_1$ is to be applied. At this stage of operation, the current flowing through transistor 11 causes the collector thereof to be at a positive-going potential. This positive-going potential is applied to the emitter of transistor 15*a*, causing that transistor to be non-conductive. As a result, no current flows through the cross-connection 13, and the base of transistor 82 is, in effect, at ground potential. This bias on the base of transistor 82 causes that transistor to conduct. Current flows through transistor 82, and the emitter thereof is at a low negative potential. This low negative-going potential is applied to the base of transistor 12, maintaining that transistor in a non-conductive state. Since transistor 12 is non-conductive, its collector is at a negative potential, thereby causing transistor 16*a* to conduct. Thus, current flows in the cross-connection 14. The resistor 35 and the 12-volt battery connected to the collector of transistor 12 act as a current sink. The current flowing into the sink is supplied through the current path including conductor 14 and transistor 16*a*. None of that current is supplied by the non-conductive transistor 12. The current flowing in conductor 14 orginates at ground, flows through pulse forming network $D_2$, resistor 18*a*, conductor 14, and by way of transistor 16*a* to the current sink.

It is to be noted that all of the current through conductive transistor 11 flows directly to the current sink, which sink is identical with the one for transistor 12.

The aforesaid current flowing through resistor 18*a* causes a negative-going potential to appear at the base of transistor 81. This negative-going potential at the base of transistor 81 appears at the emitter of said transistor by means of emitter follower action. This negative potential is supplied to the base of transistor 11 keeping that transistor in a conductive state. The aforementioned negative potential is also applied through resistors to the bases of transistors 50 and 50*a*, likewise maintaining such transistors conductive.

It will now be assumed that a negative pulse $P_{1a}$ from gate 1 is now applied to conductor 40 which connects together the emitters of transistors 11 and 12. This pulse is of sufficient magnitude to render transistors 11 and 12 non-conductive. However, since transistor 12 is non-conductive, only transistor 11 is rendered non-conductive. The potential at the collector of transistor 11 then becomes more negative and thus transistor 15*a* conducts. The current sink comprised of the resistor and the 12-volt battery connected to the collector of transistor 11 is supplied from ground through pulse forming network $D_1$, resistor 18, conductor 13 and transistor 15*a*. The pulse forming network $D_1$ is at this time effective as an added resistor in series with resistor 18. The negative potential applied to transistor 82 is therefore of a greater magnitude than the steady-state condition without the effective resistance of the pulse forming network $D_1$ in the circuit. This negative potential is coupled by transistor 82 to the base of transistor 12. The negative potential then applied to the base of transistor 12 is more negative than the negative potential applied to the base of transistor 11. As was seen previously, the transistor 81 is in a slightly conductive state as a result of the negative potential applied to its base, that negative potential being less than the magnitude of the negative potential applied to the base of transistor 82.

At the termination of the pulse $P_{1a}$, one of transistors 11 and 12 is made conductive. Transistor 12 conducts since the negative potential applied to its base is of greater magnitude than the negative potential applied to the base of transistor 11. When transistor 12 is turned on it renders transistor 16*a* non-conductive which cuts off the current flowing through the conductor 14, forming a positive pulse at the base of transistor 81 which in turn couples this pulse to the base of transistor 11, causing that transistor to be maintained in its non-conductive state. For succeeding negative-going pulses, the above operations are repeated.

It is to be noted that different-valued circuit components have been used in the modification of FIG. 3. They are shown in the following table:

| | | |
|---|---|---|
| $D_1$, $D_2$: | | |
| Series inductor | microhenries | 2.2 |
| Inductor in parallel with series combination of inductor and capacitor | microhenries | 4.7 |
| Capacitor | micromicrofarads | 10 |
| Terminating resistor | ohms | 313 |
| $D_4$, $D_{4a}$: | | |
| Series inductor | microhenries | 1.5 |
| Inductor in parallel with capacitor | do | 1.5 |
| Capacitor | micromicrofarads | 5 |
| Terminating resistor | ohms | 548 |
| Resistor 18 | do | 180 |
| Resistors 31, 35 | do | 910 |
| Resistors 39, 39*a* | do | 150 |
| Resistors 52, 52*a* | | 4.5K |

Now that the two embodiments of the invention have been described, it is to be understood that further modifications may be made within the scope of the appended claims.

What is claimed is:

1. A flip-flop circuit comprising a pair of transistors having two stable states, circuits respectively cross-connecting the collector of each transistor to the base of the other transistor, each said cross-connected circuit applying a signal from the output of one transistor to the input of the other transistor for rendering one of them conductive when the other is non-conductive, and vice versa, current supply means connected to said transistors and to said cross-connected circuits for flow of direct current through said circuits and through the conductive one of said transistors, an input circuit for each of said transistors, means for concurrently applying input pulses to said input circuits, each of said input pulses having a polarity for rendering the conductive one of said transistors non-conductive, and for maintaining non-conductive the non-conductive one of said transistors, branch control circuits respectively connected between each of said cross-connected circuits and a source of reference potential and forming with said cross-connected circuits current paths for continuous flow of direct current from said supply means, the magnitude of the current flow in one of said branch circuits abruptly increasing in the form of a current step as the conductive transistor whose collector is connected to that branch circuit is rendered non-conductive, and each of said branch control circuits including therein a pulse-forming network effective upon appearance of said current step to produce a control pulse of polarity for biasing to the conductive state the transistor having its base connected to said network, each of said pulse-forming network having circuit components which provide a time-response greater than the time-duration of each of said input pulses for rendering conductive the previously non-conductive transistor only upon the termination of each input pulse and before termination of said time-response.

2. A flip-flop circuit comprising a pair of transistors having two stable states, circuits respectively cross-connecting the base of each transistor to the collector of the other transistor for rendering one of the transistors conductive when the other of the transistors is non-conductive and vice versa, current supply means respectively connected to each transistor and to each cross-connected circuit for flow of direct current through said circuits and through the conductive one of said transistors, an input circuit common to both of said transistors, means for applying input pulses to said common input circuit of polarity for rendering the conductive one of said pair of transistors non-conductive and for maintaining non-conductive the remaining non-conductive transistor, and branch control circuits respectively connected between each of said cross-connected circuits and a source of reference potential and forming with said cross-connected circuits direct current paths for flow of current, each of said branch control circuits including therein a resistance means and a pulse-forming network, each of said pulse-forming networks having circuit components which provide a voltage pulse having a time-duration greater than that of an applied input pulse when a current step is applied thereto, said flow of current upon change of state of said conductive transistor from its conductive to its non-conductive state being transferred from the collector of said previously conductive transistor in the form of a current step to the cross-connected circuit connected thereto and to the base of the previously non-conductive transistor, said last-named pulse-forming network producing a voltage pulse preferentially biasing for conduction said previously non-conductive transistor for rendering conductive upon the termination of each input pulse and before termination of said voltage pulse the previously non-conductive transistor.

3. The flip-flop circuit of claim 1 in which there is provided additional means for concurrently applying input pulses to said input circuits of said pair of transistors.

4. The flip-flop circuit of claim 1 in which each cross-connected circuit includes in circuit therewith at least one transistor.

5. The flip-flop circuit of claim 4 in which there is associated with each of said cross-connected circuits an additional transistor for controlling the application of control signals to said pair of transistors.

6. The flip-flop circuit of claim 1 in which each pulse-forming network comprises a delay line of the lumped-circuit type having a terminating resistor in series with a second resistor together forming said branch control circuit.

7. A flip-flop circuit comprising
a pair of transistors having two stable states,
circuits respectively cross-connecting the collector of each transistor to the base of the other transistor,
each said cross-connected circuit applying a signal from the output of one transistor to the input of the other transistor for rendering one of them conductive when the other is non-conductive, and vice versa,
current supply means connected to said transistors and to said cross-connected circuits for flow of direct current through said circuits and through the conductive one of said transistors,
an input circuit for each of said transistors,
means for concurrently applying input pulses to said input circuits,
each of said input pulses having a polarity for rendering the conductive one of said transistors non-conductive and for maintaining non-conductive the non-conductive one of said transistors,
branch control circuits respectively connected to each of said cross-connected circuits and forming with them current paths for continuous flow of direct current from said supply means,
the magnitude of the current flow in one of said branch circuits abruptly increasing in the form of a current step as the conductive transistor whose collector is connected to that branch circuit is rendered non-conductive,
each of said branch control circuits including therein a pulse-forming network effective upon appearance of said current step to produce a control pulse of polarity for biasing to the conductive state the transistor having its base connected to said network,
said pulse-forming network having circuit components which provide a time-response greater than the time-duration of each of said input pulses for rendering conductive the previously non-conductive transistor only upon the termination of each input pulse,
said means for applying input pulses to said input circuits including an input transistor,
a source of supply and a control circuit for said input transistor,
said control circuit including an additional pulse-forming network, and
means for periodically supplying impulses to said control circuit,
said additional pulse-forming network having circuit components providing a round-trip propagation time less than the duration of said applied impulses for rendering ineffective that portion of said applied impulses of length greater than said round-trip propagation time,
said last-named time being less than that provided by said pulse-forming networks associated with said cross-connected transistors.

8. A flip-flop circuit comprising
a pair of transistors having two stable states,
circuits respectively cross-connecting the collector of each transistor to the base of the other transistor,
each said cross-connected circuit applying a signal from the output of one transistor to the input of the other transistor for rendering one of them conductive when the other is non-conductive and vice versa,
current supply means connected to said transistors and to said cross-connected circuits for flow of direct current through said circuits and through the conductive one of said transistors,
an input circuit for each of said transistors,
means for concurrently applying input pulses to said input circuits,
each of said input pulses having a polarity for rendering the conductive one of said transistors non-conductive and for maintaining non-conductive the non-conductive one of said transistors,
branch control circuits respectively connected to each of said cross-connected circuits and forming with them current paths for continuous flow of direct current from said supply means,
the magnitude of the current flow in one of said branch circuits abruptly increasing the form of a current step as the conductive transistor whose collector is connected to that branch circuit is rendered non-conductive,
each of said branch control circuits including therein a pulse-forming network effective upon appearance of said current step to produce a control pulse of polarity for biasing to the conductive state the transistor having its base connected to said network,
said pulse-forming network having circuit components which provide a time-response greater than the time-duration of each of said input pulses for rendering conductive the previously non-conductive transistor only upon the termination of each input pulse,
each said cross-connected circuit including at least one first transistor,
a second transistor for controlling the application of control signals to said cross-connected transistors, and
"set" and "reset" means each including a third transistor and a source of bias potential for selectively changing the conductivity state of the flip-flop circuit independently of the application of said applied input pulses.

9. The flip-flop circuit of claim 8 in which there are provided output transistors each having the base thereof connected to the collector of one of the cross-connected transistors.

References Cited in the file of this patent

UNITED STATES PATENTS

| | | |
|---|---|---|
| 2,436,808 | Jacobsen et al. | Mar. 2, 1948 |
| 2,444,438 | Grieg | July 6, 1948 |
| 2,445,448 | Miller | July 20, 1948 |
| 2,594,336 | Mohr | Apr. 29, 1952 |
| 2,759,104 | Skellett | Aug. 14, 1956 |
| 2,764,688 | Grayson | Sept. 25, 1956 |
| 2,778,978 | Drew | Jan. 22, 1957 |
| 2,840,728 | Haugk | June 24, 1958 |
| 2,846,583 | Goldfischer | Aug. 5, 1958 |
| 2,924,788 | Maurushat | Feb. 9, 1960 |
| 2,927,242 | Schultz | Mar. 1, 1960 |
| 3,008,055 | Crosby et al. | Nov. 7, 1961 |

UNITED STATES PATENT OFFICE

CERTIFICATE OF CORRECTION

Patent No. 3,066,231 November 27, 1962

Edwin J. Slobodzinski et al.

It is hereby certified that error appears in the above numbered patent requiring correction and that the said Letters Patent should read as corrected below.

Column 8, line 61, for "network" read -- networks --; column 10, line 49, after "increasing" insert -- in --.

Signed and sealed this 28th day of May 1963.

(SEAL)
Attest:

ERNEST W. SWIDER
Attesting Officer

DAVID L. LADD
Commissioner of Patents